United States Patent [19]
Sola et al.

[11] Patent Number: 5,987,765
[45] Date of Patent: Nov. 23, 1999

[54] RECONFIGURABLE SUPPORTING ELEMENT, PARTICULARLY FOR MEASURED PARTS ON A MEASURING MACHINE

[75] Inventors: Domenico Sola, Rivalta; Enrico Garau, Turin; Renato Causarano, Sciolze, all of Italy

[73] Assignee: Brown & Sharpe DEA S.p.A., Turin, Italy

[21] Appl. No.: 08/892,991

[22] Filed: Jul. 15, 1997

[30] Foreign Application Priority Data

Jul. 16, 1996 [IT] Italy .................................. TO96A0605

[51] Int. Cl.$^6$ .............................. B23Q 16/00; B23Q 3/02
[52] U.S. Cl. .................................. 33/568; 33/549; 33/573; 33/503
[58] Field of Search .............................. 33/568, 502, 503, 33/549, 573, 520

[56] References Cited

U.S. PATENT DOCUMENTS

| | | |
|---|---|---|
| 4,054,394 | 10/1977 | Neuman .................................. 403/344 |
| 4,165,567 | 8/1979 | Olsson et al. .............................. 33/288 |
| 4,580,835 | 4/1986 | Angeli et al. ...................... 297/215.13 |
| 4,848,005 | 7/1989 | Ercole et al. .............................. 33/568 |
| 5,513,555 | 5/1996 | Plank et al. .................................. 92/19 |
| 5,625,959 | 5/1997 | Ercole et al. .............................. 33/568 |
| 5,848,480 | 12/1998 | Sola et al. .................................. 33/573 |

FOREIGN PATENT DOCUMENTS

| | | |
|---|---|---|
| 1576024 | 10/1980 | United Kingdom . |
| 2310929 | 10/1997 | United Kingdom . |

*Primary Examiner*—Andrew Hirshfeld
*Assistant Examiner*—Richard A. Smith
*Attorney, Agent, or Firm*—Hall,Priddy & Myers

[57] ABSTRACT

A supporting element having a base positionable on a table of a measuring machine; a rod in turn having a vertical axis, and which is fitted to the base and movable axially to adjust the height of the supporting element; and an end portion fitted to the rod and cooperating with a position reference fixture moved by the machine; the supporting element also having locking means interposed between the rod and the end portion, and which are releasable to permit a limited amount of movement of the end portion with respect to the rod when configuring the supporting element.

8 Claims, 2 Drawing Sheets

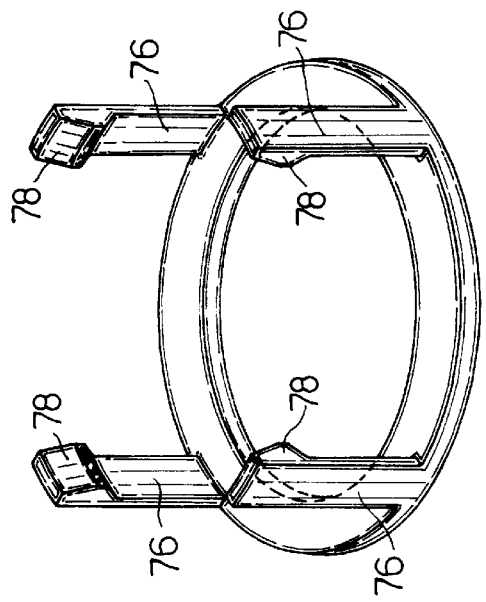
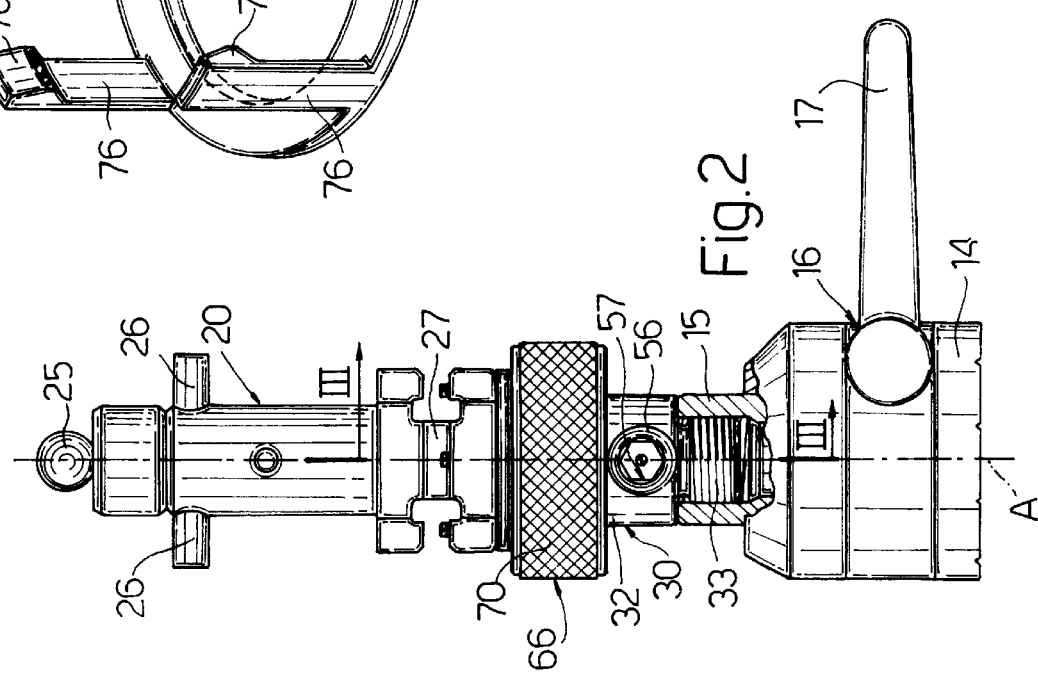
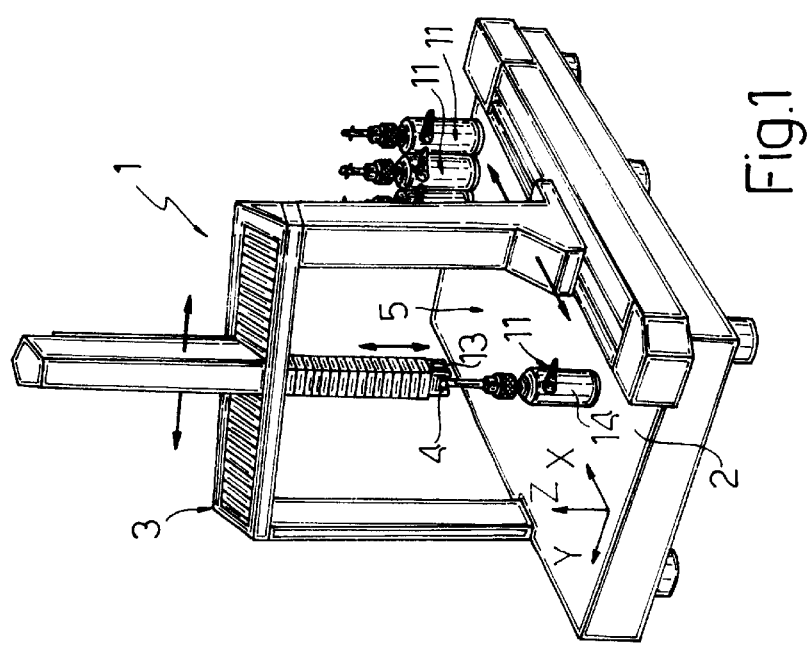

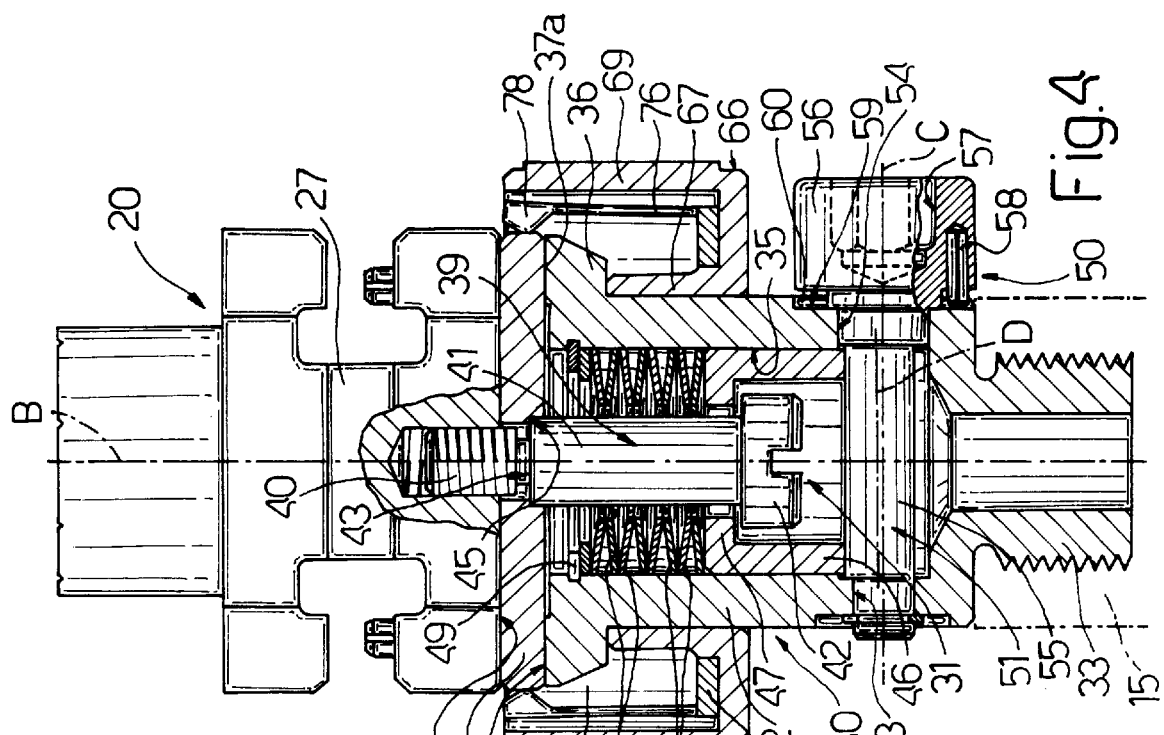
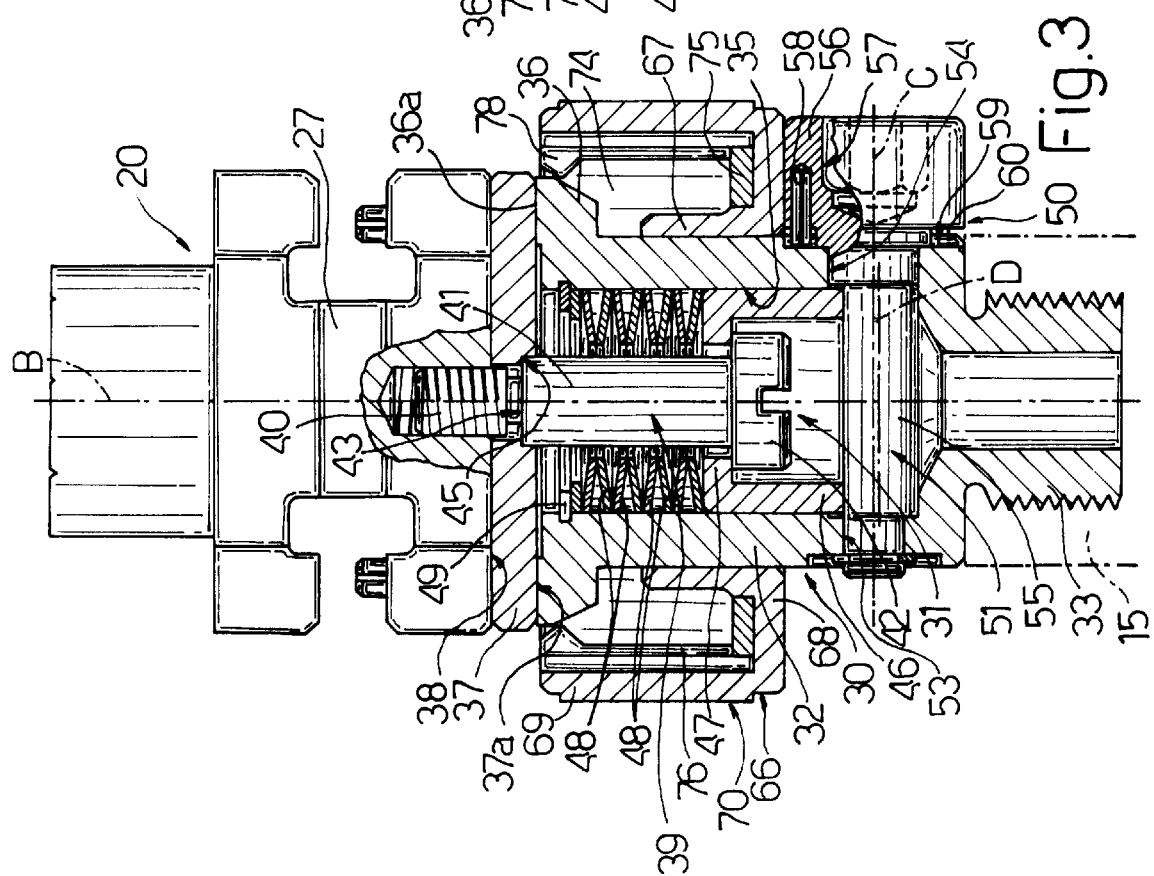

RECONFIGURABLE SUPPORTING ELEMENT, PARTICULARLY FOR MEASURED PARTS ON A MEASURING MACHINE

BACKGROUND OF THE INVENTION

The present invention relates to a reconfigurable element for supporting and positioning parts, particularly, but not exclusively, parts measured on a measuring machine.

In the following description, specific reference is made purely by way of example to the latter application.

As an alternative to conventional dedicated supporting fixtures, and to reduce retooling costs for measuring different parts, reconfigurable fixtures have been devised, as illustrated, for example, in Italian Patent Application n. TO94A-000209 filed on Mar. 22, 1994, by the present Applicant.

Briefly, such fixtures comprise a number of reconfigurable column type supporting elements, each of which substantially comprises a base secured in a predetermined position on the reference table, and a rod adjustable in height along an axis perpendicular to the reference table. Both location of the base and the height adjustment of the rod are performed manually, but using as a geometric reference a reference fixture fitted to the machine and positioned automatically by the machine within the measuring volume. The supporting element also comprises a top end integral with the rod, and which is made to cooperate with the reference fixture before the rod is locked with respect to the base, and before the base is locked onto the reference table.

Supporting elements of the above type present the following drawback.

The rod is locked in relation to the base, and the base in relation to the reference table, with the end of the supporting element engaging the reference fixture; and, as fairly strong forces are involved at this stage, structural stress may be produced in the supporting element, e.g. due to imperfect alignment of the end of the supporting element (engaging the reference fixture) and the base (locked to the reference table). Consequently, when the reference fixture is released from the end of the supporting element, the stress in the supporting element is relieved elastically, with the result that the end of the supporting element (which is fitted, in use, with an element for supporting, clamping or locating the part) is set to other than the theoretical position, thus creating a purely random, uncontrollable source of error.

SUMMARY OF THE INVENTION

It is an object of the present invention to provide a reconfigurable supporting element, particularly for a measuring machine, designed to overcome the aforementioned drawback typically associated with known fixtures.

According to the present invention, there is provided a reconfigurable supporting element for positioning and supporting parts on a machine comprising a reference surface and a movable unit, in particular a measuring machine; said supporting element comprising a base positionable on said reference surface, a rod having an axis perpendicular to said reference surface and positionable with respect to said base along said axis to adjust the total height of said supporting element, and a top end portion fitted to said rod and cooperating with a reference fixture moved by said movable unit;

characterized by comprising locking means interposed between said rod and said end portion, and releasable to permit a limited amount of relative movement between said end portion and said rod.

BRIEF DESCRIPTION OF THE DRAWINGS

A preferred, non-limiting embodiment of the present invention will be described by way of example with reference to the accompanying drawings, in which:

FIG. 1 shows, schematically, a measuring machine featuring a number of reconfigurable supporting elements in accordance with the present invention;

FIG. 2 shows a partial side view of a supporting element in accordance with the present invention;

FIGS. 3 and 4 show sections along line III—III in FIG. 2, in two different operating positions;

FIG. 5 shows a view in perspective of a detail in FIGS. 3 and 4.

DETAILED DESCRIPTION OF THE INVENTION

Number 1 in FIG. 1 indicates a known measuring machine comprising a table 2 and a movable, e.g. gantry type, measuring unit 3.

Unit 3 comprises a measuring head 4, which is movable by unit 3 along three coordinate axes X, Y, Z. More specifically, the X and Y axes are horizontal, perpendicular to each other, and define an X,Y reference plane coincident with the flat upper surface 5 of table 2; and the Z axis is vertical and therefore perpendicular to the X,Y plane.

Machine 1 also comprises a processing and control unit (not shown) connected to unit 3, and which controls displacement of the movable members of unit 3 along the coordinate axes according to programmable operating cycles.

Machine 1 is equipped with a number of reconfigurable elements 11 for supporting the parts for measurement.

Elements 11 are adjustable in height, are fittable to table 2 in predetermined positions, and are fittable with respective supporting fixtures (not shown) for supporting, locating and/or locking the part for measurement.

Machine 1 also comprises a reference fixture 13, which is fitted to measuring head 4 and is movable by unit 3 into successive predetermined positions to define, in each position, a reference position for a respective element 11.

Being of known general structure, elements 11 are not described in detail.

Very briefly, each element 11 substantially comprises a substantially cylindrical base portion 14 (hereinafter referred to simply as "base 14") with a vertical axis A; and a rod 15 of axis A, housed partly inside base 14 and movable telescopically and axially inside base 14 to adjust the total height of element 11. Rod 15 is locked in a given axial position with respect to base 14 by means of a known gripping device 16 operated manually by means of a handle 17.

Base 14 may be locked in a predetermined position on table 2 in any known manner, e.g. by magnetic air-cushion-release means or mechanical anchoring means, as described in Italian Patent Application n.TO94A-000209 of Mar. 22, 1994, the content of which is incorporated herein for reference purposes as required.

Each supporting element 11 also comprises a top end portion 20 fitted to rod 15 (FIGS. 2, 3 and 4) and having a vertical axis B parallel to and substantially coincident with axis A (as described later on).

End portion 20 (FIG. 2) comprises, in known manner, a spherical end head 25, and, close to head 25, a pair of diametrically opposite radial appendixes 26, which, together with head 25, define in known manner a given engagement position for connection to reference fixture 13.

End portion 20 also comprises a known shaped bottom block 27 defining a connection for a respective part supporting/clamping module (not shown).

According to the present invention, end portion 20 is connected to rod 15 by a joint 30 interposed between end portion 20 and rod 15 and comprising a releasable lock device 31.

More specifically (FIGS. 3 and 4), joint 30 comprises a cup-shaped body 32 having, at the bottom, a threaded fitting 33 screwed inside a threaded end of rod 15; which body 32 defines a substantially cylindrical cavity 35, and terminates at the top with an annular flange 36. Joint 30 also comprises a disk 37 fitted rigidly to the bottom face 38 of end portion 20, and which cooperates axially with flange 36 of body 32 and is slightly smaller in diameter than flange 36. Disk 37 is connected to end portion 20 by a tap screw 39, the shank of which comprises a threaded end portion 40 screwed inside end portion 20, and a remaining cylindrical portion 41 adjacent to the head 42 of screw 39 (which forms part of lock device 31 described below) and extending axially inside cavity 35 of body 32. Portion 41 forms, with end portion 40, an intermediate shoulder 43 cooperating axially with disk 37, and engages a locating seat 45 formed in disk 37.

The lock device substantially comprises an annular element 46 sliding axially inside cavity 35, and having a radial stop shoulder 47 cooperating axially with head 42 of screw 39 (on the side of head 42 facing the shank); and a pack of Belleville washers 48 housed inside cavity 35 and compressed between shoulder 47 of annular element 46 and a retaining ring 49 integral with body 32. Via annular element 46, washers 48 therefore exert pull on screw 39, and hence on end portion 20 and on disk 37 integral with screw 39, to hold disk 37 in contact with flange 36 of body 32; and the preload of washers 48 is so defined as to ensure the respective contacting surfaces 37a, 36a of disk 37 and flange 36 of body 32 adhere frictionally, and, hence, end portion 20 is locked (axially and radially) with respect to rod 15 to which body 32 is fitted rigidly.

Joint 30 also comprises a device 50 for releasing lock device 31.

Device 50 substantially comprises a shaft 51 fitted to body 32 and mounted for rotation about a respective horizontal axis C diametrical with respect to body 32. Shaft 51 is supported at the ends, in angularly free manner, inside diametrically opposite through holes 54 formed in the lateral wall of body 32, and comprises an eccentric intermediate portion 55 having an axis D parallel to axis C, and cooperating with annular element 46 in opposition to washers 48.

Shaft 51 comprises a control head 56 having a seat 57 for an operating wrench (not shown); head 56 conveniently comprises an eccentric pin 58 projecting axially towards the lateral wall of body 32, and the free end of which engages a semicircular seat 59 formed in the lateral wall of body 32, about the shaft supporting hole 54 adjacent to head 56; and seat 59 is defined angularly by stop surfaces 60 for arresting pin 58 (FIGS. 3 and 4).

Shaft 51 may therefore rotate 180° between a lock position (FIG. 3) in which axis D is located beneath axis C, so that a least eccentric generating line of intermediate portion 55 of shaft 51 cooperates with annular element 46, the elastic force of washers 48 is transmitted via element 46 onto head 42 of screw 39 and, hence, onto end portion 20, which is thus locked with respect to rod 15; and a release position (FIG. 4) in which axis D is located above axis C, so that a most eccentric generating line of intermediate portion 55 of shaft 51 cooperates with and raises annular element 46 in opposition to washers 48, thus releasing screw 39.

As disk 37 is therefore no longer forced against flange 36 of body 32, end portion 20 is free to move slightly with respect to body 32 (and to rod 15).

Element 11 also comprises a manually gripped ring nut 66 for manually moving element 11.

Ring nut 66 is fitted externally to and coaxially with body 32, and comprises, integrally, a cylindrical inner guide wall 67 slidable about body 32, a substantially flat annular base wall 68, and a cylindrical outer wall 69 conveniently comprising a knurled outer portion 70 for easy grip.

The annular cavity 74 defined by said walls of ring nut 66 houses a ring 75 resting on and centered with respect to base wall 68, and comprising four flexible, angularly equally spaced clips 76 extending integrally and axially upwards from ring 75 (FIG. 5). Clips 76 comprise respective inner end projections 78, which are located about and substantially contact flange 36 when ring nut 66 is in the FIG. 3 idle position resting by force of gravity on head 56 of shaft 51; and ring nut 66 may slide upwards along body 32 into a limit position (FIG. 4) in which inner wall 67 contacts flange 36 of body 32, and projections 78 of clips 76 cooperate with an outer surface of disk 37 so that the clips flex slightly outwards.

Element 11 operates as follows.

To position element 11 on table 2 (X, Y coordinates) and adjust the height of rod 15 (Z coordinate), base 14 is released with respect to table 2, and rod 15 is released with respect to base 14 in known manner.

Device 31 is also released by means of release device 50. More specifically, shaft 51 is rotated into the FIG. 4 release position, so that, as explained above, end portion 20 is free to move slightly with respect to rod 15.

At the reconfiguration stage, element 11 is moved manually by means of ring nut 66, which is raised as shown in FIG. 4 to pre-center disk 37 with respect to body 32 by means of clips 76. Once reference fixture 13 on movable unit 3 of machine 1 is engaged, base 14 is locked in known manner to table 2, and rod 15 is locked in known manner with respect to base 14, with joint 30 still in the configuration described; and no elastic stress is induced in element 11 by any positioning errors of base 14, by virtue of end portion 20 being disconnected with respect to rod 15, and by the clearance between the two permitting a small amount of relative movement.

At this point, lock device 31 is re-activated by restoring shaft 51 to the lock position, so that end portion 20 is locked with respect to rod 15 in the correct position determined by reference fixture 13, and which, for the reasons stated above, need not necessarily be aligned with rod 15.

By eliminating the elastic stress in element 11, no variation occurs in the position of end portion 20 when this is released from reference fixture 13, thus ensuring maximum positioning precision and repeatability.

Once joint 30 is locked, ring nut 66 may be released and allowed to fall by force of gravity into the FIG. 3 position.

Clearly, changes may be made to supporting element 11 as described and illustrated herein without, however, departing from the scope of the present invention.

We claim:

1. In an apparatus which includes a reference surface, a reconfigurable supporting element for positioning and supporting parts at a selected location on said reference surface and at a selected height, a reference fixture, and a locating unit for moving said reference fixture to a selected reference position corresponding to said selected location and height, and wherein said supporting element includes a base positionable on said reference surface, a rod having an axis perpendicular to said reference surface, and a top end portion connected to said rod and having reference means for cooperation with said reference fixture, said rod being extendable and retractable along said axis so as to vary the total height of said supporting element, the improvement comprising said reconfigurable supporting element further including a lockable and releasable joint mechanism connecting said top end portion to said rod and so constructed that when said joint mechanism is unlocked there is allowed a limited amount of relative movement between said rod and said top end portion of said supporting element.

2. The apparatus of claim 1 wherein said joint mechanism comprises contacting surfaces integral with said rod and, respectively, with said end portion and cooperating frictionally with each other, and elastic means for forcing said contacting surfaces against each other.

3. The apparatus of claim 2 wherein said joint mechanism comprises cam releasing means acting in opposition to said elastic means.

4. The apparatus of claim 3 wherein said contacting surfaces are defined respectively by a cup-shaped body fitted to said rod, and by a disk fitted beneath said end portion; said elastic means being housed inside said cup-shaped body and being preloaded between stop means respectively integral with said cup-shaped body and said disk.

5. The apparatus of claim 4 wherein said cam releasing means comprises an eccentric shaft supported transversely in said cup-shaped body and cooperating with said elastic means via a push element slidable inside said cup-shaped body.

6. The apparatus of claim 3 wherein said reconfigurable supporting element includes centering means for centering said end portion with respect to said rod when said joint mechanism is unlocked.

7. The apparatus of claim 6 wherein said reconfigurable supporting element includes grip means manually moveable between an idle position and an operating position; said centering means being supported on said manually gripped means and being active in said operating position of said manually gripped means.

8. The apparatus of claim 7 wherein said grip means comprises a ring nut fitted to said cup-shaped body and slidable axially and in radially guided manner along the cup-shaped body between said idle position and said operating position; said centering means comprising an annular element housed inside said ring nut and having a number of flexible clips cooperating, in said operating position, with said disk fitted to said end portion.

* * * * *